United States Patent
Newton et al.

(10) Patent No.: US 8,125,859 B2
(45) Date of Patent: Feb. 28, 2012

(54) METHOD AND DEVICE FOR EXTENDING INTERACTIVITY TO MULTIPLE STORAGE MEDIA

(75) Inventors: Philip Steven Newton, Eindhoven (NL); Declan Patrick Kelly, Shanghai (CN); Wilhelmus Jacobus Van Gestel, Heeze (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1039 days.

(21) Appl. No.: 11/720,627

(22) PCT Filed: Dec. 1, 2005

(86) PCT No.: PCT/IB2005/053997
§ 371 (c)(1),
(2), (4) Date: Jun. 1, 2007

(87) PCT Pub. No.: WO2006/061743
PCT Pub. Date: Jun. 15, 2006

(65) Prior Publication Data
US 2009/0231976 A1    Sep. 17, 2009

(30) Foreign Application Priority Data
Dec. 6, 2004  (EP) ..................... 04106308

(51) Int. Cl.
*G11B 21/08*  (2006.01)
(52) U.S. Cl. ............. 369/30.08; 369/30.09; 369/30.3; 369/85; 369/99
(58) Field of Classification Search .......... 369/84, 369/99, 30.08, 30.09, 30.3, 85; 386/1, 69, 386/108, 125, 95; 707/101, 810, 823; 709/203, 709/219; 358/1.15, 785, 823
See application file for complete search history.

(56) References Cited

U.S. PATENT DOCUMENTS

| | | | |
|---|---|---|---|
| 5,579,516 A | 11/1996 | Van Maren et al. | |
| 5,611,066 A | 3/1997 | Keele et al. | |
| 6,023,705 A | 2/2000 | Bellinger et al. | |
| 6,141,489 A | 10/2000 | Honda | |
| 6,507,696 B1 | 1/2003 | Chung et al. | |
| 6,529,949 B1 | 3/2003 | Getsin et al. | |
| 6,795,640 B1 | 9/2004 | Honda | |
| 2003/0172317 A1* | 9/2003 | Tsunoda et al. | 714/7 |
| 2003/0233379 A1 | 12/2003 | Cohen et al. | |
| 2005/0125357 A1* | 6/2005 | Saadat et al. | 705/57 |
| 2005/0177624 A1* | 8/2005 | Oswald et al. | 709/219 |
| 2005/0198115 A1* | 9/2005 | Sugimoto et al. | 709/203 |
| 2006/0008239 A1* | 1/2006 | Huang et al. | 386/1 |
| 2006/0165388 A1* | 7/2006 | Uesaka et al. | 386/125 |
| 2007/0183742 A1* | 8/2007 | Cowgill | 386/69 |
| 2007/0230917 A1* | 10/2007 | Okada et al. | 386/108 |
| 2008/0133564 A1* | 6/2008 | Gandolph et al. | 707/101 |

(Continued)

FOREIGN PATENT DOCUMENTS

| | | |
|---|---|---|
| CN | 1189233 A | 7/1998 |
| EP | 0836189 A1 | 4/1998 |

(Continued)

*Primary Examiner* — Thuy Pardo

(57) ABSTRACT

A method of providing interactivity over a set of multiple optical storage media (90, 91) is disclosed. A logical unit, such as a playitem of a playlist is provided on a storage medium (90) of the set of optical storage media (90, 91), comprising information about contents stored on at least one other storage medium (91) of said set of optical storage media. Furthermore, a corresponding optical disc reading apparatus, optical storage medium, and a computer-readable medium, are disclosed.

9 Claims, 7 Drawing Sheets

U.S. PATENT DOCUMENTS

2009/0323117 A1* 12/2009 Karaoguz et al. ............ 358/1.15
2010/0046924 A1*  2/2010 Ikeda et al. .................... 386/95
2010/0260016 A1  10/2010 Ikeda et al.

FOREIGN PATENT DOCUMENTS

| | | | |
|---|---|---|---|
| EP | 1102271 | A1 | 5/2001 |
| EP | 1508862 | A1 | 2/2005 |
| JP | 83155550 | A | 11/1996 |
| JP | 09055072 | A | 2/1997 |
| WO | WO0063916 | A1 | 10/2000 |
| WO | WO02067125 | A1 | 8/2002 |
| WO | 2005036555 | A1 | 4/2005 |

* cited by examiner

METHOD AND DEVICE FOR EXTENDING INTERACTIVITY TO MULTIPLE STORAGE MEDIA

FIELD OF THE INVENTION

This invention pertains in general to the field of optical storage media. More particularly the invention relates to a method and device for extending interactivity over multiple optical storage media, preferably BluRay discs (BD).

BACKGROUND OF THE INVENTION

Currently numerous pre-recorded discs, in formats such as the Digital Versatile Disc (DVD), are available on the market. These discs can be played without any other additional information. However, it is envisaged that in the future the DVD standard will be extended with new applications, for instance advanced interactive features. With such new applications in the future content authors can make the content that is currently available on the market on non-interactive DVD-discs more attractive by adding interactivity to them. Examples of such new applications are for instance adding a multi-angle view to a movie or the insertion of new scenes in the original content. One possibility is to manufacture new discs with both the existing content and the new applications. However, this requires re-authoring of the content on the pre-recorded-discs, wherein re-authoring may degrade the quality of the content.

The state of the art high-capacity storage standard is Blu-Ray, soon emerging on the market in consumer products. BluRay Disc (BD) is a radically new optical storage medium offering higher storage capacities than legacy optical storage media. It is envisaged that a BD-player will be a system, which has advanced interactive features, such as optional network access, local storage in the player, and a programmable platform in the form of Java. This means that the content author can include Java applications on the disc which can make use of the network and the local storage, combine this with the content on disc and so provide a seamless interactive movie experience to the user. Hence, BD offers a platform fulfilling the requirements for providing the above mentioned advanced interactive features.

WO-A1-0063916 discloses a system for updating content stored on a portable storage medium by means of a separate storage medium. In an embodiment disclosed in WO-A1-0063916, the separate storage medium is only received in dependence of the portable storage medium. However, WO-A1-0063916 does for instance not provide for playback of a sequence of video clips, which are located across multiple discs. Another drawback is that a separate storage medium is needed, and furthermore, Divergence Titles, for which an explanation is given hereinafter, are not supported.

A Divergence Title is a Title that has multiple playback Paths, wherein a playback path is dynamically selected at a branch point in accordance with the user's interaction and/or the program on the disc. There may also be a merge point within a Divergence Title. For instance, a Divergence Title may be applied to an adventure game. For example the user explores a cave and is presented with road choices—the user chooses a road at each branch point and finally gets to the goal or falls into a trap. This example is illustrated in FIG. 1.

As mentioned above, there is a need to provide interactivity over multiple discs, especially for BDs. Hence, one object of the invention is to provide a method and device that enable divergence titles over multiple discs. The solution according to the invention, as described hereinafter, makes it possible that a certain playback path in a divergence title is located on separate discs, which allows a content author to provide for example a game wherein the choices made during the game determine which disc should be inserted in the player, and thus for instance encourage people to buy the other discs.

In the BD format the logical organization of content on disc is done through playlists. A disc may contain one or more playlists, wherein these playlists refer to video clips on the BD. From a user's perspective, playback of a title means playback of a list of video clips, which are all referenced in one playlist. So for each title there is one playlist. However, these possibilities are limited to associating interactivity with a single disc. With respect to multiple BD discs it is not known how to extend interactivity over multiple discs. An example of a problem generated by the lack of extended interactivity is when each disc of a set of discs contains part of a video sequence and the end-user has to buy all discs to play that sequence.

Hence, an improved method of providing interactivity with optical discs would be advantageous and in particular for BD, allowing for increased flexibility and/or offering new applications would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing an optical disc reading apparatus, an optical storage medium, a method, and a computer-readable medium, according to the appended patent claims.

One solution is to make use of a local storage to extend content across multiple discs, so that the whole is greater than the parts.

An example of this system is where each disc contains part of a video sequence and you have to buy all the discs to play that sequence. In order to implement this, a special kind of playlist is used in BD according to an embodiment of the present invention.

The present application proposes preferably to use the local storage in a BD-Player to extend the interactivity over multiple discs. For example content from Disc B can access content from Disc A and so add features to Disc A. To do this an application on Disc B must be signed with the encryption key from Disc A. However, the local storage is not necessary for all embodiments.

The main point of the present invention is to provide a special playlist, which refers to content which may reside on multiple discs. This playlist is preferably stored on all the discs of that set and refers to parts of the content on each of the discs in a set. The local storage may be used to store and combine these parts of content from the different discs. When a disc is inserted into the player, the playlist is stored in the local storage of the player together with playlists of discs of the same set, previously read by the player. This provides interactivity over a plurality of discs, for instance, when all the discs of a set have been bought, the playlist can be played. However, even if no local storage is available, the playlists stored on the discs still provide interactivity over multiple discs, for instance, when a user chooses an interactive path of a title that requires content to be played from another disc than the one currently inserted in the player, the player has information on this from the playlist referring to the other disc. By asking the user to insert the other disc on which the desired content is stored according to the playlist of the current disc, the interactivity over multiple discs is provided.

The present invention has the advantage over the prior art that it allows the content author to make use of the fact that a player has the capability to combine content across multiple discs. Without the present invention, it has for instance not been possible so far to author a sequence of related video items, which are located on multiple discs.

Another advantage of the present invention is that it allows a user to select playback of a sequence of video items, where the video items are not located on a single disc and where the player does not have to be equipped with a storage medium or make use of a portable storage medium. Also with having a playlist that covers multiple discs, a content author may make use of divergence titles etc, whereby the content spans multiple discs.

According to one aspect of the invention a method of providing interactivity over a set of multiple optical storage media is provided. The method comprises the step of providing a logical unit on a storage medium of said set of optical storage media comprising information about contents stored on at least one other storage medium of said set of optical storage media. Preferably the logical unit is the above mentioned playlist, preferably stored on a BD.

According to a further aspect of the invention, an apparatus is provided. The apparatus is adapted to provide interactivity over a set of multiple optical storage media, and comprises means for reading a logical unit on a storage medium of said set of optical storage media comprising information about contents stored on at least one other storage medium of the set of optical storage media, and means configured to access the other storage medium when said logical unit points to contents of said other medium, wherein said means are operatively connected to each other.

According to yet a further aspect of the invention, a computer-readable medium is provided having embodied thereon a computer program for processing by a computer. The computer program comprises code segments for providing interactivity over a set of multiple optical discs, and comprises a first code segment for reading a logical unit on a storage medium of the set of optical storage media comprising information about contents stored on at least one other storage medium of the set of optical storage media, and a second code segment configured to access the other storage medium when said logical unit points to contents of said other storage medium.

According to another aspect of the invention an optical storage medium is provided comprising a logical unit stored thereon, wherein the medium is one of a set of optical storage media, and comprises information about contents stored on at least one other storage medium of the set of optical storage media, wherein the logical unit comprises information about contents of at least one other optical storage medium.

According to yet another aspect of the invention, a use of a playlist is provided as a means for extending interactivity to multiple optical storage media.

BRIEF DESCRIPTION OF THE DRAWINGS

These and other aspects, features and advantages which the invention is capable of will be apparent and elucidated by the following description of embodiments of the present invention, reference being made to the accompanying drawings, in which.

DESCRIPTION OF EMBODIMENTS

Figure 1:
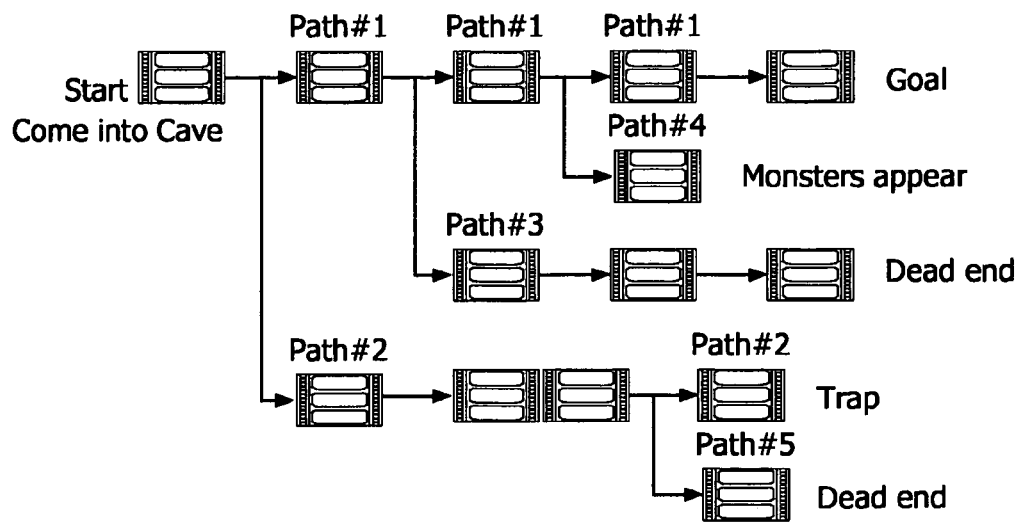
FIG. 1 is a schematic illustration of an example of a Divergence Title.

The following description focuses on an embodiment of the present invention applicable to a BD player and in particular to a BD player providing interactivity over multiple discs. However, it will be appreciated that the invention is not limited to this application but may be applied to other optical storage media having a similar organization of data.

According to the embodiment, explained in detail below, a basic playlist concept for a single disc is extended such that a playlist covers multiple discs.

In one example we assume that a BluRay disc B contains a playlist comprising information regarding the content of a BluRay disc A, and furthermore some additional content like an additional scene which explains parts of the video of disc A. In this case, the user may view the additional scene concerning disc A when playing disc B. In case the user interactively chooses to jump to the content of disc A, the player asks the user to change discs. Alternatively, in case the BD-player is a multi disc player, having e.g. a disc carousel or a disc magazine, the player automatically switches to disc A if this is inserted and identified. Alternatively, the BD-player comprises a local storage device, for instance in the form of a HDD. Through the local storage, the necessary content from disc B may be put on the HD and played back synchronously with content from Disc A, which at that moment is in the player (and not disc B).

Another example is the case where one Java application on a BluRay disc B, which is released later than a BluRay disc A, and which contains different A/V content, for example a new episode in a series, makes a video summary of the main movie title on disc A. This gives the content author the opportunity to add a new dimension to the building of a collection of discs by consumers.

This may work by signing the summary application on disc B with the key from disc A and allow the application to write itself to a HD. Then the user may insert Disc A and a summary of the main movie on disc A is automatically generated by selecting clips from the main movie and shown to the user. This is an advantageous feature in relation to films that contain several parts, such as a trilogy. Users who have bought the first part of the trilogy can this way get a summary of the first part when they buy and view the second part. However, in this case the optional local storage device is necessary.

A third example of functionality across multiple discs is by having a Java application on disc B that upgrades the playback functionality of disc A. This is useful because of the way the BD standard is defined.

The BD format will consist of two parts. The first part, which is almost finished, covers only a basic movie-playing mode of the standard, referred to as the "Movie Mode Spec". Later players will support the full functionality of the spec and will support Java with optionally local storage and network connectivity. Discs which are authored only for the movie mode spec of the standard may later be upgraded with a Java application coming from discs which are authored at a later point in time with the full spec of the standard. The Java application may be loaded onto the players HDD. The Java application is signed with the key of the old disc (disc A) and is automatically started when disc A is inserted in the player. The Java application will then replace the movie mode navigation which is stored on disc A.

Another example of an application of the embodiment of the present invention is to put bonus material across multiple discs. This may be done in such a way that the user has to buy a whole series of discs before the bonus material plays. This would work because the bonus content can be stored in parts on the HDD in the player by the Java application included on the disc. Then when all the discs in a set are bought, the content is complete and automatically shown to the user.

This for example may be a game or an extra episode of a series that is only available to the user by buying all the discs. For example an extra episode shown at Christmas on TV, which is not part of the series and is usually not included on the BDs but which you only get by buying the whole series, i.e. all the BDs.

Implementation

Figure 2:
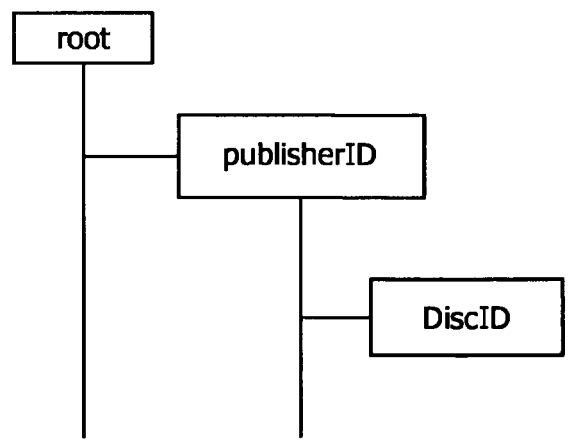
FIG. 2 is a schematic illustration of a directory hierarchy structure.

According to a practical implementation, the local storage in the player is organized such that it is possible for information to be shared across discs. For instance, the local storage is organized such that there are different directories which have different read-write permissions for a publisher or for a disc. FIG. 2 shows such a directory structure.

The access permission for the directory structure shown in FIG. 2 is as follows. For the root directory applications only have read access. For the publisherID (or organisationID) directory and the DiscID subdirectories the owner of the directory can set the file permissions such that applications from the same publisher can read the directories from other discs. It is envisaged that the values for publisherID (or organisationID) and DiscID will be included in the standard for BDs, so that these values can easily be used for this purpose.

With this structure for the local storage, it is provided that content may be shared across multiple discs such that application A may read content stored by application B and vice versa, as long of course as the both come from the same publisher.

The above illustrated principle will now be elucidated in more detail.

In the BluRay disc Rom application format, a playlist structure indicates for a certain title which video assets are presented in sequence. The following section explains the playlist and in what context within the format structure the playlist is set.

PlayList

A PlayList is a collection of playing intervals in the Clips. One such playing interval is called a PlayItem and consists of a pair of IN-point and OUT-point that point to positions on a time axis of the Clip. Therefore, a PlayList is a collection of PlayItems. Here the IN-point means a start point of a playing interval, and the OUT-point means an end point of the playing interval.

Figure 3:
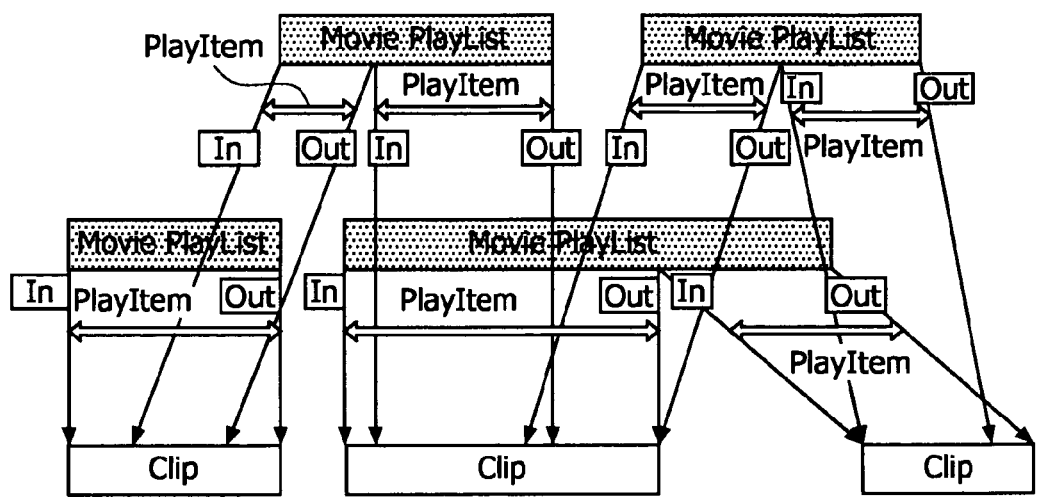
FIG. 3 is a schematic illustration of a Movie PlayList.

In BD-ROM there is only one type of PlayList: this is called a Movie PlayList, see FIG. 3.

According to the present embodiment, the playlist structure is extended for the full feature version mode, also referred to as the Java mode, of the standard such that it is possible to have a playlist that extends over multiple discs.

The syntax of a playlist is indicated in the table below:

Playlist

| Syntax | No. of bits | Mnemonic |
|---|---|---|
| PlayList( ) { | | |
|    Length | 32 | uimsbf |
|    reserved for future use | 16 | bslbf |
|    number of PlayItems | 16 | uimsbf |
|    number of SubPaths | 16 | uimsbf |
|    for (Playitem _id=0; Playitem id<number_of PlayItems; Playitem id++) { | | |
|       PlayItem( ) | | |
|    } | | |
|    for (SubPath_id=0; SubPath id<number of SubPaths', SubPath id++) { | | |
|       SubPath( ) | | |
|    } | | |
| } | | |

According to the embodiment, this playlist is extended such that it may refer to playitems, and/or sub-playitems, that exist on other discs. To do this, the PlayItemID is extended so that it is unique for multiple discs. The additional structure is a loop around the playitem ID, that contains the Disc_ID, which is unique as it is required for the BluRay CPS (Content Protection System).

With this playlist structure a content author may make a sequence of related video items and place them on multiple discs. Each of these discs contains the special playlist and the player may identify from the discID where the playitems (the video clips) referred to in the special playlist are located, i.e. on which specific disc of a set of discs comprising multiple discs the playitems are stored. The player may then for example ask the user to insert the other disc (no local storage needed), or the player may optionally have stored the data of the other disc at an earlier time on a local storage device.

The syntax of such an extended playlist is indicated in the following table:

Extended Playlist

| Syntax | No. of bits | Mnemonic |
|---|---|---|
| PlayList( ) { | | |
|    Length | 32 | Uimsbf |
|    reserved for future use | 16 | Bslbf |
|    number of Disc ID | 16 | Uimsbf |
|    For(i=0; i<number of Disc ID; i++){ | | |
|    DiscID( ); | | |
|    Number of PlayItems | 16 | Uimsbf |
|    for (Playitem _id=0; Playitem id<number of PlayItems; Playitem id++) { | | |
|       PlayItem( ) | | |
|       number of SubPaths | 16 | Uimsbf |
|    } //end for PlayItem_id | | |
|    for (SubPath id=0; SubPath id<number of SubPaths; SubPath id++) { | | |
|       SubPath( ) | | |
|    }//end for SubPath_id | | |
|    }//end for Disc_ID | | |
| }//end of PlayList( ) | | |

Below, the relevant parts of an improved concept about the data structure for HID movie mode applications are described for further elucidation of the present invention.

Figure 4:
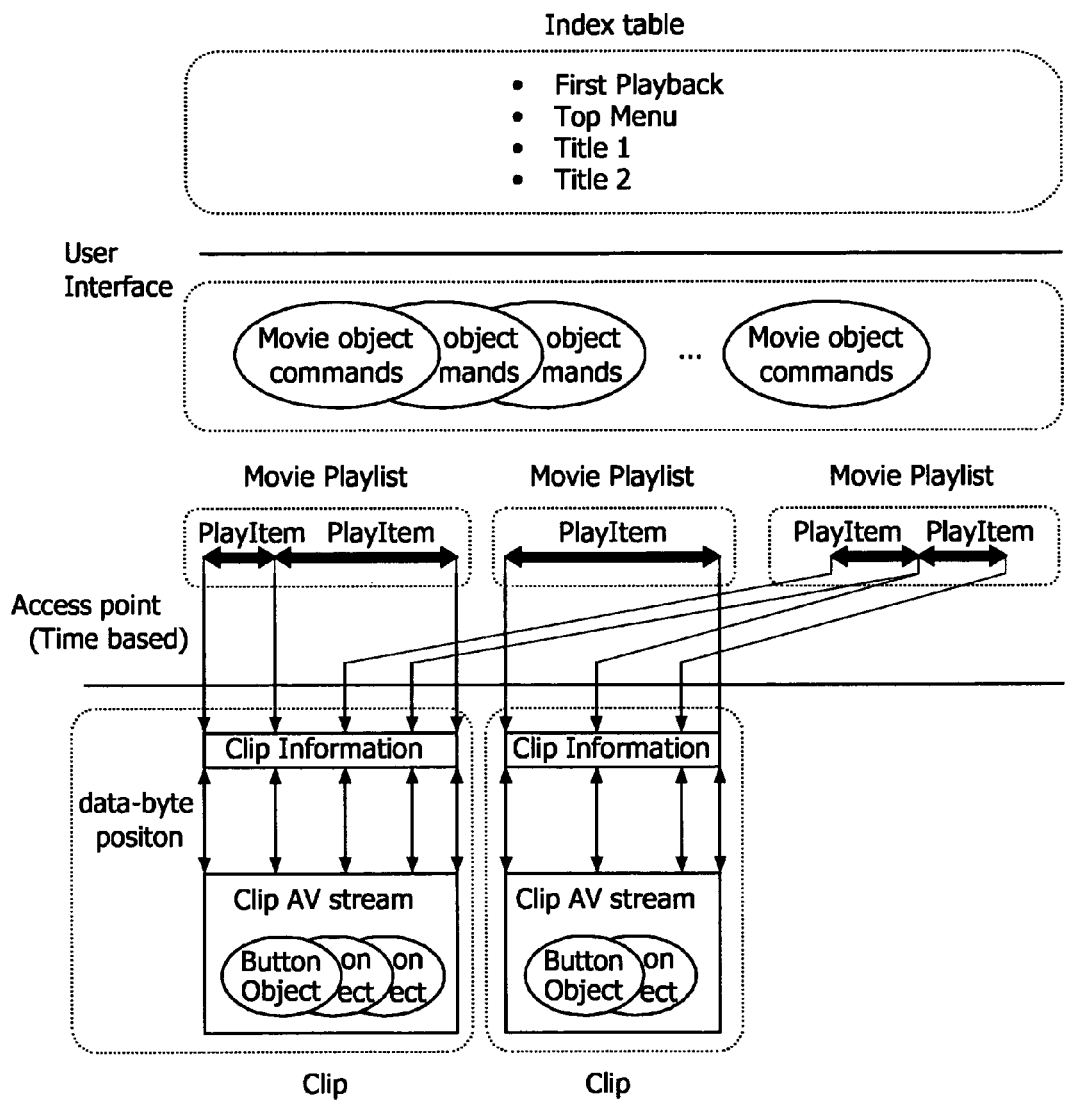
FIG. 4 is a schematic illustration of a simplified structure of the HID movie mode application format.

FIG. 4 describes a simplified structure of a HID movie mode application format. This application format has four layers for managing AV stream files: those are Index table, Movie object, PlayList and Clip, wherein a definition of these terms will be given below for a more thorough understanding.

Clip

Each pair of an AV stream file and its attribute is considered to be one object. The AV stream file is called a Clip AV stream file, and the attribute is called a Clip Information file.

An object consisting of a Clip AV stream file and its corresponding Clip information file is called a Clip.

(1) Clip AV Stream File

A Clip AV stream file stores data, which is an MPEG-2 transport stream defined in a structure conforming to this specification. The structure is called the BDAV MPEG-2 transport stream.

(2) Clip Information File

In general, a file is a sequence of data bytes. But the contents of the Clip AV stream file are developed on a time axis—therefore the access points into a Clip AV stream file are specified using time stamps.

The Clip Information file stores the time stamps of the access point into the corresponding AV stream file. The Player reads the Clip Information to find out the position where it should begin to read the data from the AV stream file.

There is a one to one relationship between a Clip AV stream file and a Clip Information file i.e., for every Clip AV stream file, there is one and only one Clip Information file.

Movie Object

A Movie Object consists of an executable navigation command program. This enables dynamic scenario description. Movie Objects are a layer above PlayLists.

Figure 5:
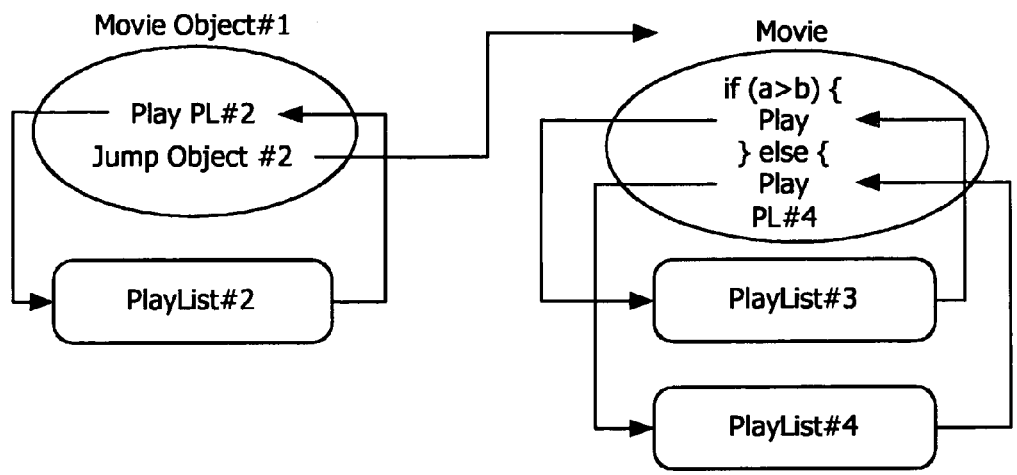
FIG. 5 is a schematic illustration of a Movie Object and PlayList.

A navigation command in a Movie Object can launch a PlayList playback or a Move Object can call another Movie Object so that a set of Movie Objects can manage playback of PlayLists in accordance with a user's interaction and preferences. This relation of Movie Objects and PlayLists is illustrated in FIG. 5.

Index Table

Figure 6:
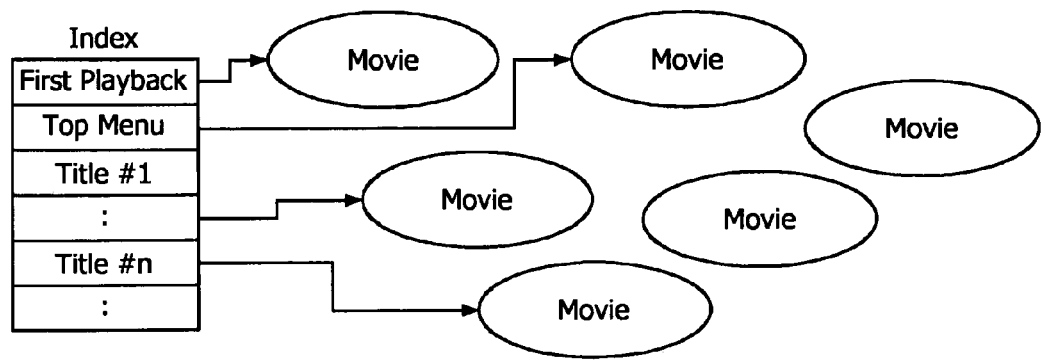
FIG. 6 is a schematic illustration of an Index Table and Movie Object.

An Index Table is a top-level table that defines Titles and a Menu and is illustrated with reference to FIG. 6. This table contains entry points for all Titles and a Menu. The Player refers to this table whenever an operation to execute Title or Menu needs to be performed.

For example, whenever a Title Search or Menu Call operation is called, the player refers to this table and finds out the corresponding Movie Object to run.

An Index Table also has an entry to a Movie Object for First Playback to perform automatic playback. When the disc is loaded the player refers to the entry of "First Playback" and obtains the corresponding Movie Object.

User-Interface Concept

The Clips, PlayLists and Movie objects are only internal to the player system and are not visible in the user interface of the player system. Only the Index table is shown to the user.

Scenario Description (PlayList and PlayItem)

PlayList and PlayItem are units for static scenario description and are not part of the user interface. The user is not aware of any existence of PlayList or PlayItem. PlayItem is a logical unit to specify a playback segment within a Clip. A PlayItem covers the whole of a Clip or a part of a Clip. A PlayList is a group of PlayItems and specifies playback order of PlayItems.

A PlayList is a linear sequence of PlayItems in presentation order except for Multi-Angle and Random/Shuffle playback. A PlayItem with multi-angle structure contains parallel paths so as to enable the user to choose one path from out of these parallel paths during playback. A PlayList with random/shuffle structure has PlayItems whose presentation order is randomized or shuffled.

If there is a branch or merger point in a scenario, the point has to lie on a PlayList boundary. A PlayList playback connecting to another PlayList playback is achieved through programming methods.

Playback within a PlayList may be a seamless presentation on condition that the boundary of PlayItems complies with the seamless playback conditions. Index of Scenario (Title and Chapter)

Title and Chapter are logical units for the user interface. The purpose of Title and Chapter is to interface with the user to choose a playback segment and display the playback position to the user on the screen.

There is an index table on the disc. Each index has an entry to a Movie Object for a Title, a Menu or automatic playback "First Playback". An index of a Title links a Movie Object and an indexed Movie Object executes a PlayList. This is a basic way of playback in HD Movie Mode Navigation System.

A title is a significant unit of playback that the user selects. A title can be composed of a chain of Movie Objects. A Movie Object can execute other Movie Objects and playback of a Title lasts while a Movie Object in a chain of Movie Objects is running. When a Movie Object terminates without jumping to another Movie Object, playback of a Title is terminated.

A Chapter is part of a Title. A Title may be divided into multiple Chapters. There is no overlap or gap between contiguous Chapters. A Chapter provides a point for the user to selectively jump into start playback using a Chapter Menu, Chapter Search or Chapter Skip. Chapter is relevant only for Movie Title and does not apply to Menu or Interactive Title. A PlayList contains information on Chapters in PlayListMark( ).

Scenario Presentation Model

Figure 7:
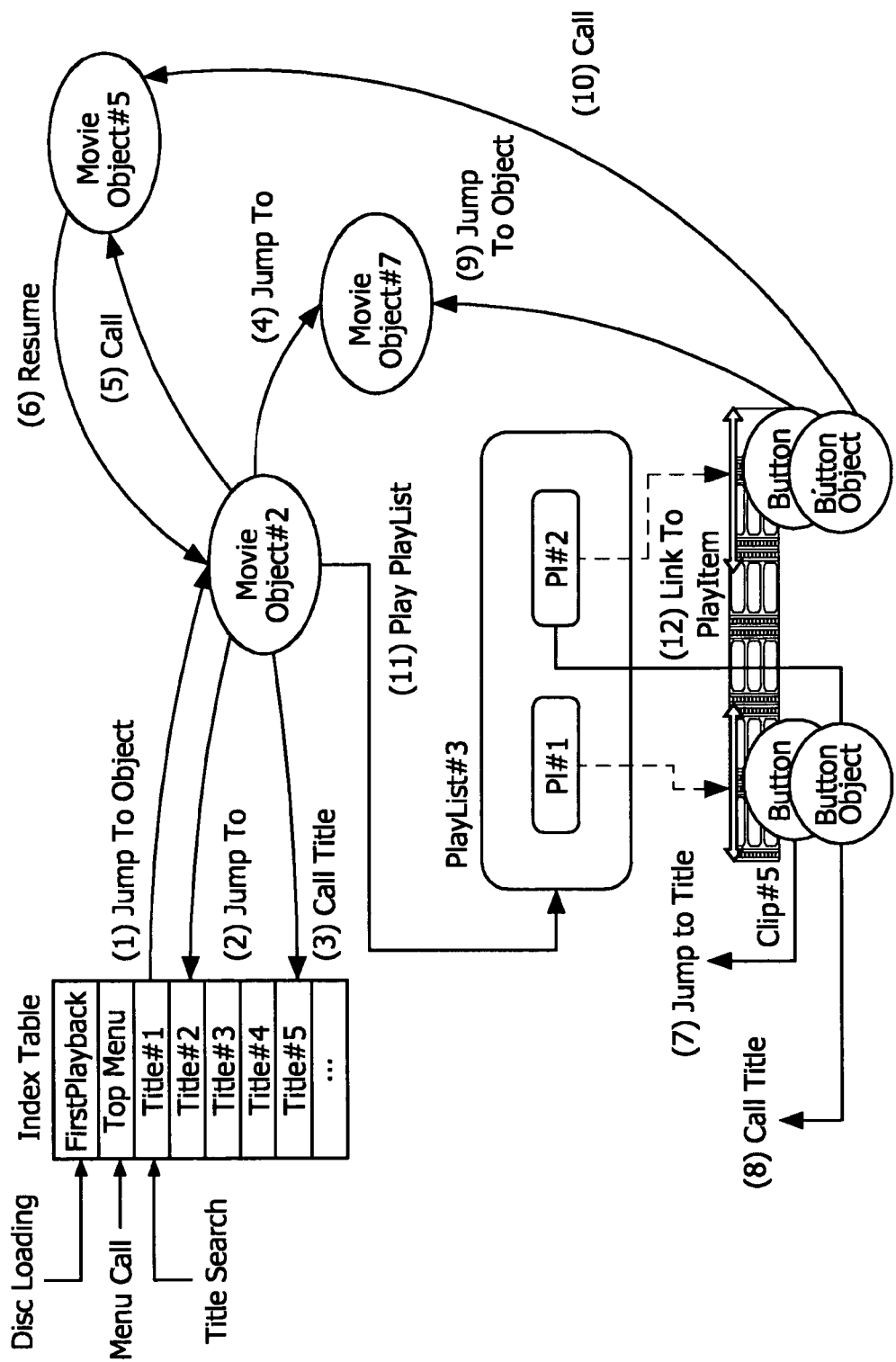
FIG. 7 is a schematic overview of a scenario description and transition.

Scenario presentation is managed by scenario description methods. Scenario presentation is represented by Scenario Transition and Playback Execution. Scenario Transition is branching from a Movie Object to another Movie Object and Playback Execution is starting PlayList playback. A scenario description is illustrated with reference to FIG. 7.

Figure 8:
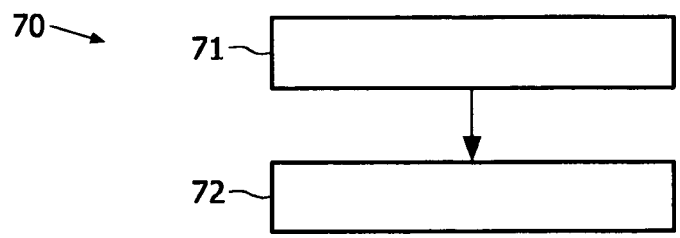
FIG. 8 is a flowchart illustrating an embodiment of the method according to the invention.

FIG. 8 shows a flowchart illustrating an embodiment of the method according to the invention in accordance with the above description. The method 70 of the embodiment is a method of providing interactivity over a set of BDs and comprises the step 72 of providing a playlist on a BD of said set of BDs. The playlist comprises information about contents stored on at least one other BD of said set of BDs. The playlist is created in step 71 during authoring of the BD and stored on the BD. Thus, the above described implementation is enabled.

Figure 9:
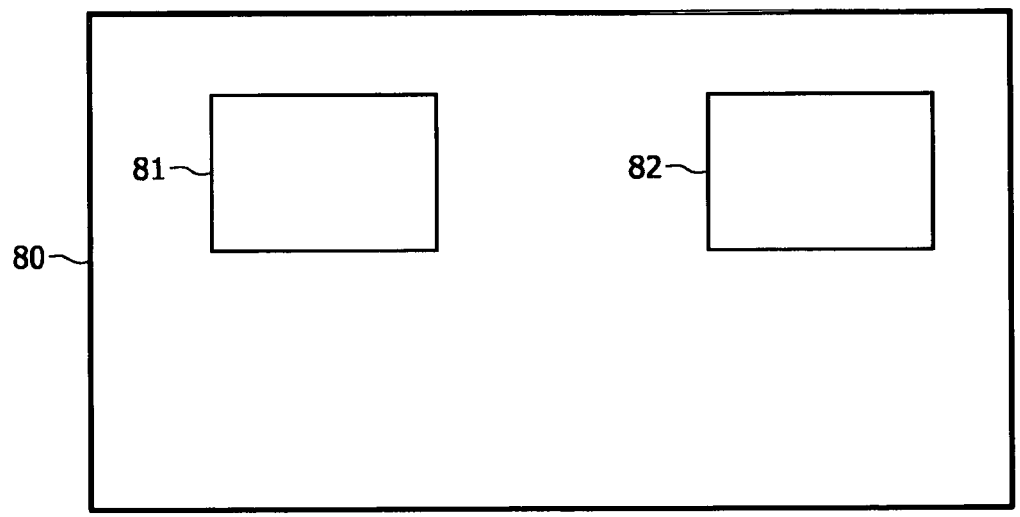
FIG. 9 is a schematic illustration of an apparatus according to an embodiment of the invention.

FIG. 9 is a schematic illustration of an apparatus 80 according to an embodiment of the invention. The apparatus 80 is a BD player adapted to provide interactivity over a set of multiple optical storage media and comprises means 81 for reading a playlist on a BD of said set of BDs, wherein the BD comprises information in the playlist about contents stored on at least one BD of the BD set. Furthermore, the apparatus 80 comprises means 82 configured to access the other BD when said playlist unit points to contents of said other BD. The means 81, 82 of BD player 80 are operatively connected to each other in an appropriate way.

Figure 10:
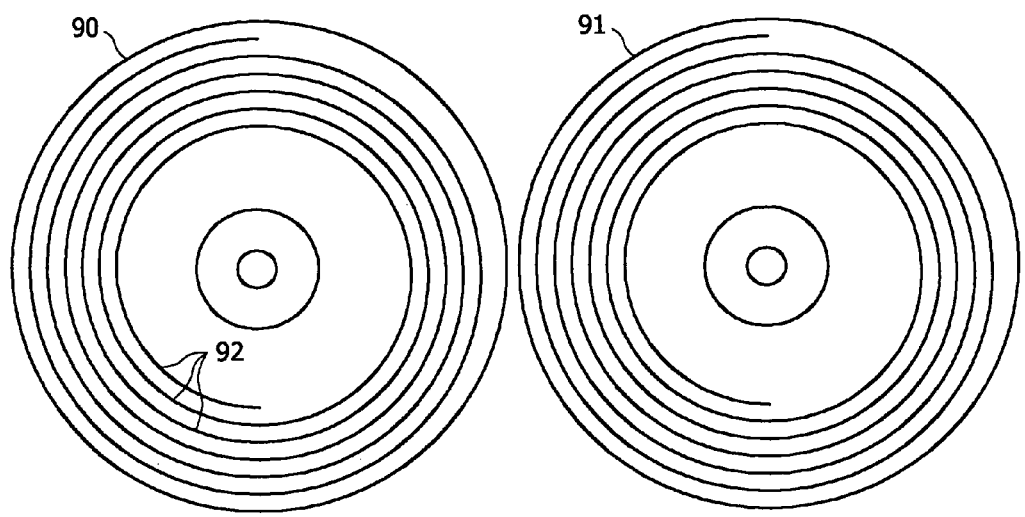
FIG. 10 is a schematic illustration of an optical storage medium according to an embodiment of another aspect of the invention.

FIG. 10 is a schematic illustration of an optical storage medium 90 according to an embodiment of another aspect of the invention. The optical storage medium 90 of the embodiment is a BD comprising a playlist stored thereon. One way of storing the playlist on the BD is to store it in the information layer of the disc comprising concentric tracks 92. The BD 90 is one of set of BDs, in the illustrated example two BDs 90, 91. The BD 90 comprises information in the playlist about contents stored on the other BD 91. Thus the above described implementation is enabled. For instance different branches of a Divergence Title are distributed over BDs 90, 91, and the information stored in the playlist is used for identifying on which medium contents related to a branch is stored. Of course BD 91 may also comprise a playlist comprising information stored on BD 90.

Figure 11:
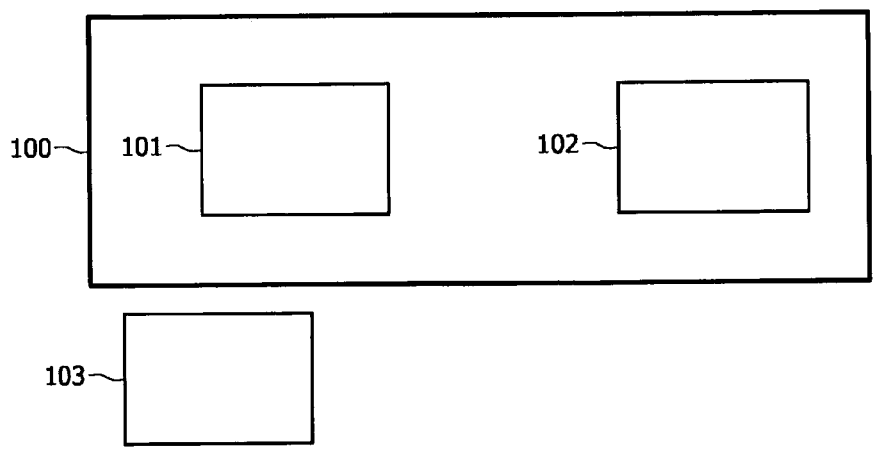
FIG. 11 is a schematic illustration of a computer-readable medium according to an embodiment of a further aspect of the invention.

FIG. 11 is a schematic illustration of a computer readable medium 100 according to an embodiment of a further aspect of the invention. The computer-readable medium 100 has embodied thereon a computer program for processing by a processing device 103, preferably comprised in the BD player described above. The computer program comprises code segments 101, 102 for providing interactivity over a set of multiple optical discs 90, 91, and comprises a first code segment 101 for reading a playlist on a BD 90 of said set of BDs 90, 91. The playlist comprises information about contents stored on the other BD of said BD set. A second code segment 102 is configured to access the other BD 91 when said playlist points to contents of said other medium 91.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to (a) specific embodiment(s), it is not intended to be limited to the specific form set forth herein. Rather, the invention is limited only by the accompanying claims and, other embodiments than the specific ones above are equally possible within the scope of these appended claims, e.g. different file principles than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of providing interactivity over a set of multiple optical storage media, said method comprising:
   reading a logical unit on a storage medium of said set of optical storage media comprising information about contents stored on at least one other storage medium of said set of optical storage media,
   accessing said other storage medium when said logical unit points to contents of said other medium of said set of optical storage media, and
   reading and accessing different branches of a Divergence Title distributed over said set of multiple optical storage media, wherein a Divergence Title is a title that has multiple playback paths, wherein a playback path is dynamically selected at a branch point in accordance with the user's interaction and/or the program on the disc, and wherein said information is for identifying on which medium from among said set of multiple optical storage media contents related to a branch are stored.

2. Method according to claim 1, wherein said logical units are play items and wherein said collection is a playlist comprising a sequence of playitems.

3. Method according to claim 2, further comprising the step of creating said logical unit during authoring of contents to be stored on said media and storing said playlist on a medium of said set of media.

4. Method according to claim 1, wherein said media are Blu-Ray discs.

5. Optical storage medium according to claim 1, wherein said medium is a Blu-Ray disc.

6. An apparatus for providing interactivity over a set of multiple optical storage media, said apparatus comprising
   means for reading a logical unit on a storage medium of said set of optical storage media comprising information about contents stored on at least one other storage medium of said set of optical storage media, and
   means configured to access said other storage medium when said logical unit points to contents of said other medium,
   wherein said means are operatively connected to each other and are adapted for reading and accessing different branches of a Divergence Title distributed over said set of multiple optical storage media, wherein a Divergence Title is a title that has multiple playback paths, wherein a playback path is dynamically selected at a branch point in accordance with the user's interaction and/or the program on the disc, and wherein said information is for identifying on which medium contents related to a branch are stored.

7. A computer-readable medium having embodied thereon a computer program for processing by a processing device, the computer program comprising code segments—for providing interactivity over a set of multiple optical discs, the computer program comprising
   a first code segment for reading a logical unit on a storage medium of said set of optical storage media comprising information about contents stored on at least one other storage medium of said set of optical storage media, and
   a second code segment configured to access said other storage medium when said logical unit points to contents of said other medium
   a third code segment configured to read and access different branches of a Divergence Title distributed over said set of multiple optical storage media, wherein a Divergence Title is a title that has multiple playback paths, wherein a playback path is dynamically selected at a branch point in accordance with the user's interaction and/or the program on the disc, and wherein said information is for identifying on which medium from among said set of multiple optical storage media contents related to a branch are stored.

8. A method of using a playlist as a means of providing interactivity over a set of multiple optical storage media, the method comprising:
- storing playlists from said multiple optical storage media on an apparatus for providing interactivity over said set of multiple optical storage media, wherein the playlist comprises information about content stored on at least one other optical storage media from among the multiple optical storage media,
- reading a playlist on an optical storage medium currently inserted into said apparatus comprising information about contents stored on at least one other optical storage media from among said set of multiple optical storage media;
- accessing multiple optical storage media different from said currently inserted optical storage media when said read playlist points to contents of said different optical storage media;
- reading and accessing different branches of a Divergence Title distributed over said set of multiple optical storage media, wherein a Divergence Title is a title that has multiple playback paths, wherein a playback path is dynamically selected at a branch point in accordance with the user's interaction and/or the program on the disc, and wherein said information is for identifying on which medium from among said set of multiple optical storage media contents related to a branch are stored.

9. Use according to claim 8, wherein said playlist is a Blu-Ray disc (BD) playlist stored on a BD comprising information about contents stored on at least one other BD of a set of multiple BDs.

* * * * *